United States Patent
Alhadidi et al.

(10) Patent No.: US 12,251,693 B2
(45) Date of Patent: Mar. 18, 2025

(54) SURFACE MODIFIED MEMBRANES

(71) Applicants: Fujifilm Manufacturing Europe B.V., Tilburg (NL); Fujifilm Corporation, Tokyo (JP)

(72) Inventors: Abdulsalam Alhadidi, Tilburg (NL); Elisa Huerta Martinez, Tilburg (NL)

(73) Assignees: Fujifilm Manufacturing Europe B.V., Tilburg (NL); Fujifilm Corporation, Tokyo (JP)

( * ) Notice: Subject to any disclaimer, the term of this patent is extended or adjusted under 35 U.S.C. 154(b) by 498 days.

(21) Appl. No.: 17/638,242

(22) PCT Filed: Jul. 21, 2020

(86) PCT No.: PCT/GB2020/051735
§ 371 (c)(1),
(2) Date: Feb. 25, 2022

(87) PCT Pub. No.: WO2021/038186
PCT Pub. Date: Mar. 4, 2021

(65) Prior Publication Data
US 2022/0288577 A1    Sep. 15, 2022

(30) Foreign Application Priority Data
Aug. 30, 2019   (GB) ..................... 1912465

(51) Int. Cl.
| | | |
|---|---|---|
| *B01J 41/13* | (2017.01) | |
| *B01D 61/42* | (2006.01) | |
| *B01D 67/00* | (2006.01) | |
| *B01D 69/02* | (2006.01) | |
| *B01D 69/12* | (2006.01) | |
| *B01J 41/07* | (2017.01) | |
| *B01J 47/12* | (2017.01) | |
| *C02F 1/44* | (2023.01) | |
| *C08J 5/22* | (2006.01) | |

(52) U.S. Cl.
CPC .......... *B01J 41/13* (2017.01); *B01D 61/428* (2022.08); *B01D 67/0006* (2013.01); *B01D 69/02* (2013.01); *B01D 69/12* (2013.01); *B01J 41/07* (2017.01); *B01J 47/12* (2013.01); *C02F 1/44* (2013.01); *C08J 5/2287* (2013.01); *B01D 2325/04* (2013.01); *B01D 2325/14* (2013.01); *B01D 2325/26* (2013.01); *B01D 2325/42* (2013.01); *C08J 2325/18* (2013.01); *C08J 2333/26* (2013.01)

(58) Field of Classification Search
CPC ........... B01D 2325/04; B01D 2325/14; B01D 2325/26; B01D 2325/42; B01D 61/428; B01D 67/0006; B01D 69/02; B01D 69/12; B01J 41/07; B01J 41/13; B01J 47/12; C02F 1/44; C08J 2325/18; C08J 2333/26; C08J 2433/26; C08J 5/2287; Y02A 20/124
See application file for complete search history.

(56) References Cited

U.S. PATENT DOCUMENTS

| | | | |
|---|---|---|---|
| 3,784,457 A | 1/1974 | Mizutani et al. | |
| 5,021,160 A | 6/1991 | Wolpert | |
| 2018/0201746 A1* | 7/2018 | Hessing | ............... C08K 5/0025 |

FOREIGN PATENT DOCUMENTS

| | | |
|---|---|---|
| EP | 3181619 A1 | 6/2017 |
| WO | 2000/50160 A1 | 8/2000 |
| WO | 2014/165984 A1 | 10/2014 |
| WO | 2017/009603 A1 | 1/2017 |

OTHER PUBLICATIONS

Nebavskaya et al. "Electrochemical Properties of Homogeneous and Heterogeneous Anion Exchange Membranes Coated with Cation Exchange Polyelectrolyte" Membranes 2019, 9, 13; doi: 10.3390/membranes9010013.

Vaselbehagh et al. "Improved antifouling of anion-exchange membrane by polydopamine coating in electrodialysis process". Desalination 332 (2014) 126-133.

* cited by examiner

*Primary Examiner* — Dirk R Bass
(74) *Attorney, Agent, or Firm* — Banner & Witcoff, Ltd.

(57) ABSTRACT

A composite ion exchange membrane comprising components (a) and (b):
(a) a membrane layer comprising ionic groups, two opposing surfaces and optionally a porous support;
(b) a layer comprising sulpho groups bound to at least one of the at least two opposing surfaces of the membrane layer (a);
wherein the layer comprising sulpho groups has a thickness of less than 100 nm and the composite ion exchange membrane has a surface zeta potential of 0 to −7.5 mV.

18 Claims, No Drawings

SURFACE MODIFIED MEMBRANES

RELATED APPLICATIONS

This application is a National Stage Application under 35 U.S.C. 371 of co-pending PCT application PCT/GB2020/051735 designating the United States and filed Jul. 21, 2020; which claims the benefit of GB application number 1912465.0 and filed Aug. 30, 2019, each of which are hereby incorporated by reference in their entireties.

This invention relates to ion exchange membranes and to processes for their preparation and use.

Ion exchange membranes are used in electrodialysis, reverse electrodialysis, electrolysis, diffusion dialysis, batteries and a number of other applications. Typically the transport of ions through the membranes occurs under the influence of a driving force such as an ion concentration gradient or, alternatively, an electrical potential gradient.

Ion exchange membranes are generally categorized as cation exchange membranes or anion exchange membranes, depending on their predominant charge. Cation exchange membranes comprise negatively charged groups that allow the passage of cations but reject anions, while anion exchange membranes comprise positively charged groups that allow the passage of anions but reject cations.

It is known to surface-treat ion exchange membranes with an oppositely-charged species in order to modify their properties. For example, WO2014165984 describes the surface treatment of ion exchange membranes with a polymerizable solution comprising (i) a charged ionic monomer having one or more ethylenic groups selected from (meth)acryloxy groups, (meth)acrylamido groups, and vinylbenzyl groups, (ii) a hydrophobic crosslinking agent having two or more ethylenic groups selected from (meth)acryloxy groups, (meth)acrylamido groups, and vinylbenzyl groups, (iii) a free radical initiator, and (iv) a solvent medium. In Example 3 of WO2014165984, a cation exchange membrane comprising negative charges was surface modified using a composition comprising 4,4'-methylene bis(cyclohexyl acrylamide) crosslinker and positively charged (3-acrylamidopropyl)trimethyl ammonium chloride in a molar ratio of about 0.86. Guler et al., J. of Membrane Science, 455, p. 254-270, 2014, describe an example wherein an anion exchange membrane is coated with a composition comprising 2 wt % of N,N'-methylene bisacrylamide (MBA) and 5 wt % of 2-acryloylamido-2-methylpropanesulfonic acid (AMPS) which corresponds to a molar ratio of 0.54.

Nebavskaya et al, Membranes 2019, 9, 13 pages 3 to 5, describes homogeneous and heterogeneous anionic exchange membranes coated with cationic exchange polyelectrolytes based on Nafion which is a non-grafted, dense and visible layer (5 µm by SEM).

Vaselbehagh et al, Desalination 332 (2014) 126-133, describes the improved antifouling of anion-exchange membrane by a polydopamine coating. The polydopamine was not covalently bound to the membrane.

There is a desire to provide membranes having properties, e.g. good permselectivity, low electrical resistance and a long lifetime in actual use. In particular, ion exchange membranes are desired which have low or no affinity for foulants.

Due to the ionic nature of ion exchange membranes they have a strong affinity for oppositely charged components present in feed streams. Many colloidal materials (organic or inorganic) and microorganisms present in feed streams have a negative surface charge. Therefore, such negatively charged components have the tendency to deposit on cationically charged membrane surfaces. Adsorption of components such as humic acid onto ion exchange membranes typically changes the colour of the membrane surface and decreases the membrane performance by blocking the passage of other ions, thereby increasing the electrical resistance of the membrane.

According to the present invention there is provided a composite ion exchange membrane comprising components (a) and (b):
(a) a membrane layer comprising ionic groups, two opposing surfaces and optionally a porous support;
(b) a layer comprising sulpho groups bound to at least one of the at least two opposing surfaces of the membrane layer (a);
wherein the layer comprising sulpho groups has a thickness of less than 100 nm and the composite ion exchange membrane has a surface zeta potential of 0 to −7.5 mV.

The surface zeta potential is preferably measured by to the method described below.

In this document (including its claims), the verb "comprise" and its conjugations is used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually mean "at least one".

For brevity in this specification we often refer to the component (a) as the "untreated membrane". Thus the terms "untreated membrane" and "membrane layer comprising ionic groups, two opposing surfaces and optionally a porous support" and "membrane layer (a)" are interchangeable, with the former usually referring to the membrane layer before it has been converted into the composite ion exchange membrane of the present invention and the latter two usually referring to the membrane layer after it has been converted into the composite ion exchange membrane.

The composite ion exchange membrane of the present invention has a much lower zeta potential than the membranes described in WO2014165984. This has the advantage that the present membranes have a low affinity for negatively charged contaminants (e.g. foulants) typically found in feed solutions and are permeable to both monovalent and polyvalent ions. As a consequence, the membranes of the present invention have a low tendency to foul-up during use. Furthermore, the composite ion exchange membranes of the present invention advantageously have a low electrical resistance.

The thickness of the composite ion exchange membrane, including the porous support when present, is preferably less than 250 µm, more preferably from 5 to 200 µm, most preferably from 10 to 150 µm, e.g. about 20, about 50, about 75 or about 100 µm.

The composite ion exchange membrane preferably has a low water permeability so that (hydrated) ions may pass through the membrane and (free) water molecules do not easily pass through the membrane. Preferably the composite ion exchange membrane's water permeability is lower than $1.10^{-9}$ m$^3$/m$^2$·s·kPa, more preferably lower than $1.10^{-10}$ m$^3$/m$^2$·s·kPa, most preferably lower than $5.10^{-11}$ m$^3$/m$^2$·s·kPa, especially lower than $3.10^{-11}$ m$^3$/m$^2$·s·kPa.

Preferably the composite ion exchange membrane has a permselectivity for small cations (e.g. Na$^+$) or anions (e.g. Cl$^-$) above 90%, more preferably above 95%.

Preferably the composite ion exchange membrane has an electrical resistance less than 8 ohm·cm$^2$, more preferably less than 5 ohm·cm$^2$, most preferably less than 3 ohm·cm$^2$, especially less than 2 ohm·cm$^2$. The electrical resistance may be measured by the method described below, preferably using a 2M aqueous solution of NaCl at 25° C. For certain applications a high electrical resistance may be acceptable especially when the permselectivity is very high, e.g. higher than 95%, and the water permeation low, for example for processes that operate with low conductivity streams such as systems used for producing ultrapure water and/or drinking water. The electrical resistance may be determined by the method described below in the examples section.

The membrane layer (a) is preferably a cation exchange membrane or an anion exchange membrane, depending on its predominant charge. Cation exchange membranes comprise negatively charged groups that allow the passage of cations. Anion exchange membranes comprise positively charged groups that allow the passage of anions.

Typically the membrane layer (a) has been obtained by a process comprising the polymerisation of a curable composition comprising (i) one or more monomers having at least one polymerizable group and an ionic group; and optionally (ii) a crosslinking agent not comprising an ionic group. Membrane layer (a) may be obtained commercially, e.g. from FUJIFILM.

Preferred monomers having at least one polymerizable group and an anionic group preferably comprise an acidic group, for example a sulpho, carboxy and/or phosphato group, especially a sulpho group.

Preferred monomers having at least one polymerizable group and a cationic group preferably comprise a quaternary ammonium group.

Preferably membrane layer (a) is a cationically charged membrane, e.g. an anion exchange membrane. Preferably the membrane layer (a) has an ion exchange capacity of at least 0.1 meq/g, more preferably of at least 0.3 meq/g, especially more than 0.6 meq/g, more especially more than 1.0 meq/g, based on the total dry weight of the membrane (including the porous support when present). Ion exchange capacity may be measured by titration of the membrane layer (a) before it has been converted into the composite ion exchange membrane of the present invention by the method of Długolecki et al, J. in Membrane Science, 319 (2008) on page 217.

Preferably the membrane layer (a) exhibits a swelling in water of less than 100%, more preferably less than 75%, most preferably less than 60%. The degree of swelling can be controlled by the amount of crosslinking agents, the amount of non-curable compounds and by selecting appropriate parameters in the curing step and further by the properties of the porous support (when present).

Permselectivity (PS) and % swelling of the membrane layer (a) in water may be measured before it has been converted into the composite ion exchange membrane of the present invention by the methods described by Długolecki et al, J. of Membrane Science, 319 (2008) on pages 217-218.

Typically the membrane layer (a) is substantially non-porous, e.g. in swollen state impregnatable by small molecules. The membrane preferably has pores all of which are smaller than the detection limit of a standard Scanning Electron Microscope (SEM). Thus using a Jeol JSM-6335F Field Emission SEM (applying an accelerating voltage of 2 kV, working distance 4 mm, aperture 4, sample coated with Pt with a thickness of 1.5 nm, magnification 100,000×, 3° tilted view) the average pore size is generally smaller than 2 nm, especially smaller than 1 nm.

Preferably the membrane layer (a) comprises a porous support (i.e. porous before it has been included in the membrane layer). As examples of porous supports which may be included in the membrane layer (a) there may be mentioned woven and non-woven synthetic fabrics and extruded films. Examples include wetlaid and drylaid non-woven material, spunbond and meltblown fabrics and nano-fiber webs made from, e.g. glass fiber, polyethylene, polypropylene, polyacrylonitrile, polyvinyl chloride, polyester, polyamide, and copolymers thereof. Porous supports may also be porous membranes, e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene and polychlorotrifluoroethylene membranes.

Preferably the porous support has a porosity before it has been included in the membrane layer of 30 and 95%. The porosity of the support may be determined by a porometer, e.g. a Porolux™ 1000 from IB-FT GmbH, Germany.

The porous support, when present, may be treated to modify its surface energy, e.g. to values above 45 mN/m, preferably above 55 mN/m. Suitable treatments include corona discharge treatment, plasma glow discharge treatment, flame treatment, ultraviolet light irradiation treatment, chemical treatment or the like, e.g. for the purpose of improving the wettability and the adhesiveness of the porous support.

Commercially available porous supports are available from a number of sources, e.g. from Freudenberg Filtration Technologies (Novatexx materials), Lydall Performance Materials, Celgard LLC, APorous Inc., SWM (Conwed Plastics, DelStar Technologies), Teijin, Hirose, Mitsubishi Paper Mills Ltd and Sefar AG.

In one embodiment the support is derived from one or more aromatic monomers, e.g. such as aromatic polyamide (aramid), (sulfonated) polyphenylenesulfone, poly(phenylene sulfide sulfone), polyphenylenesulfide and combinations comprising two or more thereof.

The layer (b) comprising sulpho groups is preferably a coating layer. The layer (b) may be included to provide a repulsion layer, i.e. providing the function of avoiding surface pollution or reducing the extent to which the composite ion exchange membrane fouls in use. Thus the layer (b) is particularly useful for reversing the positive charge on the surface of the membrane layer (a) (the untreated membrane) of an anion exchange membrane, e.g. by providing an anionically charged layer (b) bound to the surface of membrane layer (a) by, for example, curing.

For brevity in this specification the layer (b) comprising sulpho groups is also referred to as layer (b).

The layer (b) is preferably obtained by polymerising a curable composition comprising a monomer comprising a polymerizable group and an anionic group on the membrane layer (a). Alternatively the layer (b) need not be covalently bound to the membrane layer (a) and instead one may use a polymeric layer as the layer (b) prepared by the general method described by Vaselbehagh et al in Desalination 332 (2014) 126-133.

A further option to provide the composite ion exchange membrane with a layer (b) having the defined zeta potential is to treat the membrane layer (a) with plasma, preferably atmospheric plasma, such that the surface of the membrane layer (a) obtains a negative charge e.g. by reacting negatively charged compounds with the surface of the membrane layer (a).

If needed the surface of the membrane layer (a) can be made more reactive by corona discharge treatment, plasma glow discharge treatment, e.g. plasma enhanced chemical vapour deposition, microwave plasma treatment, flame treatment, ultraviolet light irradiation treatment, chemical treatment, e.g. treatment with sodium, formaldehyde, Ce(IV) ions or ozone, gamma ray or ion-beam irradiation treatment.

The thickness of the layer (b) is preferably less than 10 nm, especially less than 5 nm. The layer (b) need not form a continuous layer on the membrane layer (a). However it is preferred that the layer (a) provides the surface of the composite ion exchange membrane with a substantially uniform surface zeta potential. The surface zeta potential of the layer (b) is preferably such that the composite ion exchange membrane has a selectivity ratio for monovalent ions to multivalent ions of less than 3 (e.g. from 1 to below 3). The selectivity ratio may be measured by the method described below. The selectivity P nitrate/sulphate is preferably measured in an ED stack of 10 cell pairs of 10×10 cm$^2$ membrane area using an aqueous solution of 5.65 mmol/L sodium chloride, 1.04 mmol/L sodium sulphate and 1.61 mmol/L sodium nitrate as feed at a linear flow velocity of 4.6 cm/s and applying a constant current of 0.11 A continuously across the ED stack.

The layer (b) may be bound to an opposing surface of the membrane layer (a) by any suitable means, including ionically or, more preferably, by covalent bonding. For example, components used to form the layer (b) may be reacted with the membrane layer (a) to form a covalent bond therebetween, e.g. by means of a polymerisation process which both forms the layer (b) and binds the layer (b) to the membrane layer (a). In a preferred embodiment, one or more of the components used to form the layer (b) contain polymerizable groups, e.g. ethylenically unsaturated groups, which react with groups present on the surface of the membrane layer (a) which have remained after the membrane layer (a) has been prepared. In one embodiment the layer (b) is grafted from the surface of the membrane layer (a) by curing the layer (b) after applying it to the surface of the membrane layer (a). Thus preferably the grafting starts at the surface of the membrane layer (a) and the graft chain grows from there during the grafting reaction instead of an oligomer chain forming in solution and subsequently reacting with the surface of the membrane layer (a). A suitable grafting method is described in outline by M. Stamm (ed.) in Polymer Surfaces and Interfaces, the article entitled "Grafting on Solid Surfaces: "Grafting to" and "Grafting from" Methods", pages 215-216.

Preferably the layer (b) is obtained from the polymerisation of a curable composition comprising a monomer comprising a polymerizable group and an anionic group having a molecular weight (MW) which satisfies the equation:

$$MW < (300 + 300n)$$

wherein:
MW is the molecular weight of the monomer; and
n has a value of 1, 2, 3 or 4 and is the number of ionic groups present in the monomer.

In the above equation, MW is more preferably $<(250+250n)$, even more preferably $<(200+200n)$, especially $<(150+200n)$, wherein MW and n are as hereinbefore defined.

The monomer comprising a polymerizable group and an anionic group preferably comprises one or more ethylenically unsaturated groups. Depending on the pH of the curable composition, the ionic groups may partially or wholly be in the form of a salt with a counterion.

The preferred ethylenically unsaturated groups which may be present in the monomers comprising a polymerizable group and an anionic group are (meth)acrylic, allylic or styrenic groups. The (meth)acrylic groups are preferably (meth)acrylate or (meth)acrylamide groups, more preferably acrylic groups, e.g. acrylate or acrylamide groups.

When calculating the MW of the monomer the molecular weight of the counterion is assumed to be equal to hydrogen, even when the monomer is wholly or partially in the form of a salt with a counterion.

Examples of monomers comprising a polymerizable group and an anionic group include acrylic acid, beta carboxy ethyl acrylate, maleic acid, maleic acid anhydride, vinyl sulphonic acid, phosphonomethylated acrylamide, (2-carboxyethyl)acrylamide, 2-(meth)acrylamido-2-methyl-propanesulfonic acid, styrenesulfonic acid, and mixtures comprising two or more thereof.

Optionally the layer (b) comprises one or more anionic groups in addition to the sulpho groups.

Preferably the layer (b) has a sulphur/carbon atomic ratio of 0.010 to 0.050, more preferably 0.012 to 0.040 and especially 0.015 to 0.035. The sulphur/carbon atomic ratio may be measured by the method described below.

Preferably the layer (b) has a sulphur/nitrogen atomic ratio of 0.30 to 0.50 when measured according to the method specified below.

Preferably the layer (b) has a sulphur/oxygen atomic ratio of 0.07 to 0.13, more preferably 0.08 to 0.12. The sulphur/oxygen atomic ratio may be measured by the method described below.

The atomic ratio of sulphur/carbon, sulphur/nitrogen and sulphur/oxygen of the layer (b) may be determined by X-ray photoelectron spectroscopy ("XPS"), preferably by using an Amicus instrument from Kratos Analytical with power settings Al filament with 25 mA Emission Current and 12 kV Acceleration Voltage.

Preferably the layer (b) is obtained by polymerising a curable composition comprising 4 to 35 wt %, more preferably 5 to 35 wt %, e.g. 10 or 20 wt %, of the monomer comprising a polymerizable group and a sulpho group. The remaining components of the curable composition are preferably selected from solvents, radical initiators, neutral monomers, non-ionic crosslinking agents and further additives.

The curable composition may comprise one or more than one monomer comprising a polymerizable group and a sulpho group (preferably one monomer or 2 to 5 monomers, each comprising a polymerizable group and a sulpho group).

The curable composition may further comprise monomers not having a sulpho group, i.e. ionic monomers having an ionic group other than sulpho and neutral monomers. Such further monomers may comprise one or more polymerizable groups such as ethylenically unsaturated groups, preferably only one. The neutral monomer may be effective to dilute the amount of charge that is remaining at the surface after the applying and curing the curable composition. Preferably the neutral monomer is present in an amount of 0 to 30 wt %, more preferably 0 to 20 wt %, relative to the total weight of the curable composition. If one of the neutral monomers comprises more than one polymerizable group, i.e. being a non-ionic crosslinking agent, it is preferably present in a low amount.

If present, the non-ionic crosslinking agent(s) preferably each independently have two to six ethylenically unsaturated groups, more preferably two or three, especially two ethylenically unsaturated groups.

Examples of non-ionic crosslinking agents having from two to six acrylamide groups include N,N'-methylene bis(meth) acrylamide, N,N'-ethylene bis(meth)acrylamide, N,N'-propylene bis(meth)acrylamide, N,N'-butylene bis(meth)acrylamide, N,N'-(1,2-dihydroxyethylene) bis-(meth) acrylamide, 1,4-diacryloyl piperazine, 1,4-bis(acryloyl)homopiperazine, triacryloyl-tris(2-aminoethyl)amine, triacroyl diethylene triamine, tetra acryloyl triethylene tetramine, 1,3,5-triacryloylhexahydro-1,3,5-triazine and/or 1,3,5-trimethacryloylhexahydro-1,3,5-triazine. The term '(meth)' is an abbreviation meaning that the 'meth' is optional, e.g. N,N'-methylene bis(meth) acrylamide is an abbreviation for N,N'-methylene bis acrylamide and N,N'-methylene bis methacrylamide.

Preferably the curable composition comprises 0 to 3 wt % of non-ionic crosslinking agents, more preferably 0 to 1 wt %, especially 0 to 0.1 wt %. If non-ionic crosslinking agents are present in the curable composition the molar ratio of non-ionic crosslinking agents to the monomers comprising at least one polymerizable group and an anionic group is preferably lower than 0.04. The ratio may also be zero. A ratio of zero means that the curable composition does not comprise non-ionic crosslinking agents.

The curable composition used to form the layer (b) optionally further comprises an inert solvent. The optional inert solvent may be any solvent which does not copolymerise with the monomers during the process. The inclusion of an inert solvent can be useful for reducing the viscosity and/or surface tension of the curable composition, making the manufacturing process easier in some respects.

In one embodiment the inert solvent comprises at least 50 wt % water, more preferably at least 70 wt % water, relative to the total amount of inert solvent. Thus the inert solvent preferably comprises less than 30 wt % inert organic solvent and any remaining inert solvent is water. In one embodiment the curable composition is free from inert organic solvents, providing environmental advantages due to the complete absence of (volatile) inert organic solvents.

Preferably the layer (b) is obtained from a curable composition comprising 40 to 92 wt %, more preferably 60 to 90 wt %, of inert solvent.

The bonding of the layer (b) to the membrane layer (a) is preferably achieved thermally (e.g. by irradiating the curable composition with infrared light or by heating) or, more preferably, by irradiating the aforementioned curable composition with ultraviolet light or an electron beam. The membrane layer (a) may be reacted with the curable composition used to make the layer (b) by a process comprising irradiating and/or heating the curable composition while the curable composition is in contact with the membrane layer (a).

For the thermal reaction the curable composition used to make the layer (b) preferably comprises one or more thermally reactive free radical initiators. Examples of thermally reactive free radical initiators include organic peroxides, e.g. ethyl peroxide and/or benzyl peroxide; hydroperoxides, e.g. methyl hydroperoxide, acyloins, e.g. benzoin; certain azo compounds, e.g. α,α'-azobisisobutyronitrile and/or γ,γ'-azobis(γ-cyanovaleric acid); persulphates; peracetates, e.g. methyl peracetate and/or tert-butyl peracetate; peroxalates, e.g. dimethyl peroxalate and/or di(tert-butyl) peroxalate; disulfides, e.g. dimethyl thiuram disulfide and ketone peroxides, e.g. methyl ethyl ketone peroxide. Temperatures in the range of from about 30° C. to about 150° C. are generally employed for infrared curing. More often, temperatures in the range of from about 40° C. to about 110° C. are used.

Preferably the layer (b) is obtained from a curable composition comprising one or more than one free radical initiator. Preferably the curable composition used to make the layer (b) comprises 0 or 0.01 to 10 wt %, more preferably 0.05 to 5 wt %, especially 0.1 to 2 wt %, of free radical initiator. The preferred free radical initiator is a photoinitiator.

For acrylamides, diacrylamides, and higher-acrylamides, type I photoinitiators are preferred. Examples of type I photoinitiators are as described in WO 2007/018425, page 14, line 23 to page 15, line 26, which are incorporated herein by reference thereto. Especially preferred photoinitiators include alpha-hydroxyalkylphenones, e.g. 2-hydroxy-2-methyl-1-phenyl propan-1-one and 2-hydroxy-2-methyl-1-(4-tert-butyl-) phenylpropan-1-one, acylphosphine oxides, e.g. 2,4,6-trimethylbenzoyl-diphenylphosphine oxide, and bis(2,4,6-trimethylbenzoyl)-phenylphosphine oxide, and phenylphosphinates, e.g. ethyl (2,4,6-trimethylbenzoyl) phenylphosphinate and lithium phenyl-2,4,6-trimethylbenzoylphosphinate.

When a free radical initiator is present in the curable composition used to make the layer (b), preferably a polymerization inhibitor is also included (e.g. in an amount of below 2 wt %). This is useful to prevent premature curing of the curable composition during, for example, storage. Suitable inhibitors include hydroquinone, hydroquinone mono methyl ether, 2,6-di-t-butyl-4-methylphenol, 4-t-butyl-catechol, phenothiazine, 4-oxo-2,2,6,6-tetramethyl-1-piperidinoloxy, free radical, 4-hydroxy-2,2,6,6-tetramethyl-1-piperidinoloxy, free radical, 2,6-dinitro-sec-butylphenol, tris(N-nitroso-N-phenylhydroxylamine) aluminum salt, Omnistab™ IN 510, and mixtures comprising two or more thereof.

In one embodiment the curable composition used to make the layer (b) is free from free radical initiators. When the curable composition is free from free radical initiators the curable composition may be reacted with the membrane layer (a) by a process comprising irradiating the curable composition with electron beam radiation.

Where desired, a surfactant or combination of surfactants may be included in the curable composition used to make the layer (b), e.g. as a wetting agent or to adjust surface tension. Commercially available surfactants may be utilized, including radiation-curable surfactants. Surfactants suitable for use in the curable composition include non-ionic surfactants, ionic surfactants, amphoteric surfactants and combinations thereof. Preferred surfactants are as described in WO 2007/018425, page 20, line 15 to page 22, line 6, which are incorporated herein by reference thereto. Fluorosurfactants are particularly preferred, especially Zonyl® FSN and Capstone® fluorosurfactants (produced by E.I. Du Pont). Also preferred are polysiloxane based surfactants, especially Surfynol from Air Products, Xiameter surfactants from Dow-Corning, TegoPren and TegoGlide surfactants from Evonik, Siltech and Silsurf surfactants from Siltech, and Maxx organosilicone surfactant from Sumitomo Chemical.

Typically the membrane layer (a) comprises a front side and a back side as opposing surfaces and only one of the front side and backside is reacted with the curable composition used to make the layer (b) or both the front side and the back side are reacted with a curable composition used to make layers (b). When both the front side and the back side are reacted with a curable composition used to make the layers (b) the curable composition used on each side may be the same as each other or different. Thus the curable composition used to make the layer (b) may be applied to one or to both sides of the membrane layer (a) to achieve a symmetrical or asymmetrical composite ion exchange membrane. In a preferred embodiment the reaction comprises irradiating the curable composition used to make the layer (b) present on the membrane layer (a) with electron beam or ultraviolet irradiation.

The membrane layer (a) and/or the composite membrane may be subjected to a corona discharge treatment, plasma glow discharge treatment, flame treatment, ultraviolet light irradiation treatment, chemical treatment or the like, e.g. for the purpose of improving its wettability and the adhesiveness.

In a preferred embodiment the curable composition used to make the layer (b) comprises:
i) from 4 to 35 parts of ethylenically unsaturated monomer(s) having a sulpho group;
ii) from 0 to 30 parts of neutral monomer(s);
iii) from 40 to 92 parts of inert solvent(s); and
iv) from 0 to 10 parts of photoinitiator(s).

The parts of i), ii), iii) and iv) are by weight and preferably the number of parts of i)+ii)+ iii)+iv) add up to 100.

According to a second aspect of the present invention there is provided a process for preparing a composite ion exchange membrane comprising reacting a membrane layer (a) (preferably having reactive groups at its surface) with a curable composition comprising:
(i) a monomer comprising at least one polymerizable group and a sulpho group; and
(ii) optionally a neutral monomer.

Preferably the curable composition used to make the layer (b) is as defined and preferred as described above in relation to the first aspect of the present invention.

Preferably layer (b) is covalently bound to the membrane layer (a) and preferably one or more of the compounds used to make layer (b) are reactive with groups present on the surface of membrane layer (a). In this way one may form a very strong bond between Layers (a) and (b).

The process of the present invention may contain further steps if desired, for example washing and/or drying the resultant composite ion exchange membrane.

When the composite ion exchange membrane is washed, the amount of ionic groups derived from the curable composition used to make the layer (b) present on the composite ion exchange membrane after washing is to some extent determined by the properties of the membrane layer (a) (i.e. the untreated membrane) to which the curable composition used to make the layer (b) was applied, especially by the amount of remaining reactive (i.e. ethylenically unsaturated) groups present in the untreated membrane which are capable of reacting with the curable composition used to make the layer (b). Also the extent of swelling of the membrane layer (a) may affect the remaining amount of ionic groups derived from the curable composition used to make the layer (b). The amount of remaining reactive groups present on the membrane layer (a) to which the curable composition used to make the layer (b) is applied and the extent of swelling can be controlled by the choice of curable composition and by the curing conditions used for the preparation of the membrane layer (a) (i.e. the untreated membrane). For example, by reducing the relative amount of crosslinking agent or by reducing the radiation dose in the curing step used to make the membrane layer (a) (i.e. the untreated membrane) the extent of swelling increases which may result in a higher penetration of the curable composition used to make the layer (b) into the membrane layer (a). When the radiation dose is decreased it is likely that the relative number of reactive groups remaining after curing increases. These modifications applied to the membrane layer (a) have an influence on the amount of ionic groups derived from the curable composition used to make the layer (b) present after washing and may be used to fine-tune the properties of the resultant composite ion exchange membrane. Further the curable composition used to make the layer (b) and the amount applied to the membrane layer (a) (i.e. the untreated membrane) may be tuned to prepare a composite ion exchange membrane having the desired properties.

Preferably the process further comprises the step of washing unreacted curable composition used to make the layer (b) from the composite ion exchange membrane. Our experiments indicated that a large proportion of the curable composition does not react with the membrane layer (a) and is removed in such a washing step. This procedure makes the process used to bond the layer (b) to the membrane layer (a) much easier since no strict metering is required and allows a large variation of coating techniques to prepare the composite ion exchange membrane. Following this observation, we found that particularly good results could be achieved when the curable composition used to make the layer (b) is not too concentrated, i.e. contains a large proportion of solvent.

While it is possible to prepare the composite ion exchange membrane of the present invention on a batch basis using a stationary, untreated membrane, it is much preferred to prepare the composite ion exchange membrane on a continuous basis using a moving untreated membrane. The untreated membrane may be in the form of a roll which is unwound continuously or the untreated membrane may rest on a continuously driven belt (or a combination of these methods may be used). Using such techniques the curable composition used to make the layer (b) can be applied to the untreated membrane on a continuous basis or it can be applied on a large batch basis.

The curable composition used to make the layer (b) may be applied to the untreated membrane (i.e. membrane layer (a)) by any suitable method, for example by curtain coating, blade coating, air-knife coating, knife-over-roll coating, slide coating, nip roll coating, forward roll coating, reverse roll coating, micro-roll coating, dip coating, foulard coating, kiss coating, rod bar coating or spray coating.

The curable composition used to make the layer (b) typically forms a continuous film layer on the membrane layer (a), although this is not essential as mentioned above. The coating of multiple layers can be done simultaneously or consecutively. When coating multiple layers, the curable compositions used to make the layer (b) may be the same or different.

Thus the application step may be performed more than once, either with or without curing being performed between each application. When applied to different sides the resultant composite ion exchange membrane may be symmetrical or asymmetrical.

Thus in a preferred process, the curable composition used to make the layer (b) is applied continuously to a moving untreated membrane, preferably by means of a manufacturing unit comprising one or more curable composition application station(s), one or more irradiation source(s) for curing the curable composition, a composite ion exchange membrane collecting station and a means for moving the untreated membrane (with layer (b) applied to it) from the curable composition application station(s) to the irradiation source(s) and to the membrane collecting station.

The curable composition application station(s) may be located at an upstream position relative to the irradiation source(s) and the irradiation source(s) is/are located at an upstream position relative to the membrane collecting station.

In order to produce a sufficiently flowable curable composition for application by a high speed coating machine, it is preferred that the curable composition used to make the layer (b) has a viscosity below 5000 mPa·s when measured at 35° C., more preferably from 1 to 1500 mPa·s when measured at 35° C. Most preferably the viscosity of the curable composition used to make the layer (b) is from 2 to 500 mPa·s when measured at 35° C. With suitable coating techniques, the curable composition used to make the layer (b) may be applied to a moving untreated membrane at a speed of over 1 m/min, e.g. 5 m/min, preferably over 10 m/min, more preferably over 15 m/min.

Reaction of the untreated membrane and the curable composition used to make the layer (b) is preferably performed by radical polymerisation, preferably using electromagnetic radiation. The source of radiation may be any source which provides the wavelength and intensity of radiation necessary to cure the curable composition. A typical example of a UV light source for curing is a D-bulb with an output of 600 Watts/inch (240 W/cm) as supplied by Fusion UV Systems. Alternatives are the V-bulb and the H-bulb from the same supplier.

When no photoinitiator is included in the curable composition used to make the layer (b), the curable composition can be cured by electron-beam exposure, e.g. using an exposure of 50 to 300 keV. Reaction can also be achieved by plasma or corona exposure.

During reaction the monomer(s) typically polymerise to form a very thin layer of anionically charged material on the membrane layer (a). Generally no visibly distinct layer is formed but the surface of the membrane layer (a) is modified (e.g. 'surface-modified') by the reaction with the curable composition used to make the layer (b). The reaction (or curing) may be brought about by any suitable means, e.g. by irradiation and/or heating. Preferably the reaction occurs sufficiently rapidly to form a composite ion exchange membrane within 30 seconds. If desired further curing may be applied subsequently to finish off, although generally this is not necessary.

Preferably curing of the curable composition used to make the layer (b) begins within 3 minutes, more preferably within 60 seconds, after the curable composition has been applied to the membrane layer (a).

Preferably the curing is achieved by irradiating the curable composition used to make the layer (b) for less than 30 seconds, more preferably less than 10 seconds, especially less than 3 seconds, more especially less than 2 seconds. In a continuous process the irradiation occurs continuously and the speed at which the curable composition moves through the beam of irradiation is mainly what determines the time period of curing. The exposure time is determined by the irradiation time by the concentrated beam; stray 'light' generally is too weak to have a significant effect.

Preferably the curing uses ultraviolet light. Suitable wavelengths are for instance UV-A (390 to 320 nm), UV-B (320 to 280 nm), UV-C (280 to 200 nm) and UV-V (445 to 395 nm), provided the wavelength matches with the absorbing wavelength of any photoinitiator included in the curable composition used to make the layer (b).

Suitable sources of ultraviolet light are mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized. The exposure intensity is one of the parameters that can be used to control the extent of curing which influences the final structure of the membrane. Preferably the exposure dose is at least 40 mJ/cm$^2$, more preferably between 40 and 1500 mJ/cm$^2$, most preferably between 70 and 900 mJ/cm$^2$ as measured using a High Energy UV Radiometer (UV PowerMap™ from EIT, Inc) in the UV-A and UV-B range indicated by the apparatus.

To reach the desired exposure dose at high coating speeds, more than one UV lamp may be used, so that the curable composition is irradiated more than once.

Photoinitiators may be included in the curable composition, as mentioned above, and are usually required when curing uses UV or visible light radiation.

According to a third aspect of the present invention there is provided use of a composite ion exchange membrane according to the first aspect of the present invention for treatment of an aqueous liquid, especially for desalination.

Although the membranes of the present invention are primarily intended for use in treatment of aqueous liquids (e.g. desalination by electrodeionisation or electrodialysis, including continuous electrodeionisation (CEDI) and electrodialysis reversal (EDR), capacitive deionisation used in e.g. flow through capacitors (FTC), Donnan or diffusion dialysis (DD) for e.g. fluoride removal or the recovery of acids), capacitive electrodialysis (CED) for e.g. aqueous desalination or selective ion removal, they may also be used for other purposes requiring membranes having ionic groups, e.g. pervaporation for dehydration of organic solvents, fuel cells, electrolysis (EL) of water or for chlor-alkali production, and for the generation and/or storage of energy, e.g. by reverse electrodialysis (RED) or redox flow batteries.

According to a fourth aspect of the present invention there is provided an electrodialysis or reverse electrodialysis unit, an electrodeionisation module, a flow through capacitor, a diffusion dialysis apparatus, a membrane distillation module, a redox flow battery, a microbial desalination cell, or a membrane electrode assembly, comprising one or more membranes according to the first aspect of the present invention. The electrodeionization module is preferably a continuous electrodeionization module.

Preferably the electrodialysis or reverse electrodialysis unit or the electrodeionization module or the flow through capacitor comprises at least one anode, at least one cathode and two or more membranes according to the first aspect of the present invention.

In a preferred embodiment the unit comprises at least 1, more preferably at least 5, e.g. 36, 64, 200, 600 or up to 1500, membrane pairs according to the first aspect of the present invention, the number of membranes being dependent on the application. The membrane may for instance be used in a plate-and-frame or stacked-disk configuration or in a spiral-wound design.

The surface zeta potential of the composite membrane may be measured using an electrokinetic analyser, for example, an Anton Paar SurPASS Electrokinetic Analyzer, as illustrated in the Examples. The measurement may be performed on the layer (b) when it is bound to the membrane layer (a). This device is thereby suitable to determine the presence and amount of anionic groups at the surface of the composite membrane. The surface zeta potential (mV) correlates to the amount of ionic groups present at the surface of the composite membrane. The composite ion exchange membrane preferably has a surface zeta potential of −1 mV to −6 mV.

Preferably the surface zeta potential of the composite ion exchange membrane is as measured after the composite ion exchange membrane has been stored for 16 hours in a 25 mM solution of potassium chloride solution in distilled water having a pH of 4. The pH of 4 may be achieved by including hydrochloric acid in the potassium chloride solution. The zeta-potential is preferably measured at room temperature (23° C.) using an Anton Paar SurPASS Electrokinetic Analyzer using 25 mM KCl solution at pH 4 in milli-Q ultrapure water as electrolyte.

The present invention provides composite ion exchange membranes having a good permselectivity for both monovalent ions and multivalent ions. In many applications it is not desirable for ion exchange membranes to have high monovalent ion selectivity, i.e. a much higher selectivity for monovalent ions than for polyvalent ions. Monovalent ion selectivity may be expressed in terms of the composite membrane's transport number for nitrate ions relative to sulphate ions ($P_{SO4}^{NO3}$). Preferably the composite ion exchange membranes of the present invention have a $P_{SO4}^{NO3}$ of lower than 3.0, more preferably lower than 2.8, especially lower than 2.0. The monovalent ion selectivity of the composite ion exchange membranes of the present invention may be determined by the method described below in the Examples.

Ion exchange membranes of the prior art often have a large electrical resistance which contributes to a high stack resistance of the electrodialysis device. Preferably the composite ion exchange membranes of the present invention are such that the electrical resistance of a model stack containing 10 cell pairs of composite ion exchange membranes according to the present invention of area 10×10 cm$^2$ is lower than 200 ohm, more preferably lower than 150 ohm, especially lower than 100 ohm.

The invention will now be illustrated with non-limiting Examples where all parts and percentages are by weight unless specified otherwise.

In the Examples the following properties were measured by the methods described below.

Measurement of Surface Zeta Potential

The surface Zeta potential measurements of the layer (b) were performed three times on each sample of composite ion exchange membrane and the results quoted below represent the average of the three results.

Samples of the composite ion exchange membrane under test were stored in KCl solution (25 mM, pH=4, adjusted using 0.05M HCl) at room temperature (23° C.) for at least one night before measuring their surface zeta potential.

The surface zeta potential measurements were performed at room temperature (23° C.) using an Anton Paar SurPASS Electrokinetic Analyzer with software Attract 2.0 using the following settings:
  Cell: Adjustable Gap Cell
  Sample size: 20×10 mm
  Type: single measurement
Parameter Settings for Automated Measurement:
  Preparation: Rinse
  Rinse Target Pressure/mbar: 300
  Time Limit/s: 900
  Ramp Target Pressure/mbar: 400
  Max. Ramp Time/s: 20
  Measure: Streaming Current
  Electrolyte: KCl solution (25 mM, pH=4 in milli-Q ultrapure water)

After filling each cell it was rinsed for about 10 minutes. At the end of the rinse period the gap height was adjusted to 100±2 μm. A Flow Check was performed at 400 mbar and the measurement was started.

A cleaning procedure was performed after each measurement.

Measurement of the Layer (b)'s Surface Composition and Calculation of the Sulphur/Carbon Atomic Ratio, Sulphur/Nitrogen Atomic Ratio and Sulphur/Oxygen Atomic Ratio Surface elemental analysis of the layer (b) present in the composite ion exchange membranes was performed by XPS analysis using a Kratos Analytical AMICUS XPS instrument (Software, Vision 2 Software for Windows).

The Following Settings were Applied:
  Anode: Mg
  Emission current: 25 mA
  Acceleration voltage: 12 kV
  Measurement cycles: 4 (1 for survey)

| Region name | Start eV | End eV | Step eV | Dwell ms | # Sweeps |
|---|---|---|---|---|---|
| C 1s | 300 | 277 | 0.1 | 150 | 3 |
| O 1s | 544 | 524 | 0.1 | 150 | 3 |
| N 1s | 410 | 390 | 0.05 | 600 | 3 |
| Cl 2p | 210 | 192 | 0.1 | 600 | 3 |
| S 2p | 178 | 163 | 0.1 | 600 | 3 |
| Ca 2p | 358 | 343 | 0.1 | 600 | 3 |
| Si 2p | 115 | 95 | 0.1 | 300 | 3 |
| survey | 1100 | 0 | 1 | 100 | 1 |

The quantification was based on the complete area (not peak height) and the results were reported at 95% confidence. The analysis was done on three positions on the composite ion exchange membrane surface and repeated in 4 cycles resulting in 12 data points for each sample. The values are expressed as atomic % (atomic % (i)=$N_i/N_{tot}$× 100% where $N_i$ are the number of atoms of interest and $N_{tot}$ are the total number of atoms). Only the results of carbon, sulphur, nitrogen and oxygen are shown in Table 4 below; other elements are present in small amounts and are not shown.

In order to remove unreacted material from the surface of the composite ion exchange membrane, before the analysis the samples of composite ion exchange membrane were pre-conditioned first in milli-Q ultrapure water for 60 minutes at 60° C. After that, the samples of composite ion exchange membrane were rinsed with the milli-Q ultrapure water and gently dried for 17 hours at 30° C.

After the amounts of sulphur, carbon, nitrogen and oxygen had been measured the sulphur/carbon atomic ratio, sulphur/nitrogen atomic ratio and sulphur/oxygen atomic ratio were determined by calculating the fraction of the values obtained for the respective elements (atomic ratio (n/m)=atomic percent (n)/atomic percent (m).

Determination of Affinity to Colorants

The affinity to colorants of the composite ion exchange membranes was determined using a colorimetric method. The colour of the composite ion exchange membranes after prolonged contact with a liquid comprising humic acid is an indication of the affinity of the membrane for such colorants. The darker the colour the higher the affinity for charged dyes. A low increase of colour indicated desirable behaviour for the composite ion exchange membrane.

The colorant (humic acid) was applied to the surface layer of the composite ion exchange membranes using a dye-test cub as follow:
1. Preparation of the colorant solution: the negatively charge colorant was prepared by dissolving 100 mg of humic acid (Sigma Aldrich) in 1 L of milli-Q ultrapure water. The solution was stirred for 60 minutes at 300 rpm. The solution was clear and free from undissolved particles.
2. Preparation of the composite ion exchange membrane sample: a circular dyeing cub was designed in which a sample of the composite ion exchange was fixed with 6 screws and an O-ring at the bottom of the cub. The net diameter of the sample exposed to the dye was 63.6 mm. One side of the composite ion exchange membrane was exposed to the colorant.
3. Dye test: 40 ml of the colorant solution prepared in step 1 was added to the circular dyeing cup. The colorant solution was kept on the surface of the composite ion exchange membrane for 1 hour at room temperature (22±1° C.). To avoid the evaporation during the experiment, the dye cub was placed in a small closed cabinet.

The UV absorption (at 380 nm) of the composite ion exchange membrane before and after exposure to the colorant solution was measured using Cary 100 Cony UV visible spectrophotometer with integrating sphere made by Labsphere Inc. model DRACA 30-I operated with software Cary WinUV. The UV absorption measurement was performed on three different positions on independent duplicate samples and the results represent the average of the six results. As blank sample a fresh composite ion exchange membrane sample was used which had not been exposed to the colorant solution.

After removing the sample of composite ion exchange membrane from the dye-cub, the sample was rinsed with milli-Q ultrapure water. After that, the sample was dried for 15 minutes at 40° C.

The absorption increase was calculated by dividing the value at 380 nm of the sample that had been treated with the colorant solution by the value at 380 nm of the sample that had not been treated with the colorant solution.

Measurement of Electrical Resistance (ER)

The electrical resistance (ER) of the composite ion exchange membranes were measured using a six compartment with a four-electrode arrangement as described by P. Dlugolecki et al, J. of Membr. Sci. 319 (2008), page 217-218. The cell was made from polycarbonate; the solution volume of each compartment was 2 dm$^3$. The compartments are separated by membranes having an effective area of 9.6 cm$^2$. The membrane under investigation was the central membrane; the other membranes were placed as follows: Cathode—CMX—AMX—Ref. electrode—central membrane—Ref. electrode—CMX—CMX—Anode, wherein AMX and CMX are a standard anion exchange membrane and a standard cation exchange membrane respectively from Astom Corp., Japan. The anode and cathode electrodes were platinum coated titanium electrodes. The reference electrodes were Haber-Luggin capillary electrodes filled with 3M KCl from Sigma Aldrich connected to Ag/AgCl electrodes from Metrohm. Through the electrode compartments was pumped a 0.5M solution of Na$_2$SO$_4$ from Sigma Aldrich at a flow rate of 250 ml/min.

Through the other compartments was pumped a 2M solution of NaCl from Sigma Aldrich at a flow rate of 250 ml/min. Cole Parmer masterflex console drive (77521-47) with easy load II model 77200-62 gear pumps were used for all compartments. The membrane under investigation was equilibrated in a 2M NaCl solution for 17 hours.

The measurements were performed at a temperature of 25±0.2° C. An Autolab galvanostat power supply from Metrohm was used to supply the current over the six compartment cell. The Ag/AgCl electrodes were used to measure the potential difference over the membrane under investigation at different currents (between 0 and 1 A).

The total resistance (solution and membrane resistance) was given by the slope of the applied current density versus the voltage curve.

To obtain the pure membrane resistance (ER), the obtained value was corrected for the solution resistance subtracting the value of a blank resistance measurement without membrane sample.

Measurement of Selectivity $P_{SO4}^{NO3}$

The selectivity P nitrate/sulphate was measured using a model stack containing 10 cell pairs of the composite ion exchange membranes of area 10×10 cm$^2$. A test feed solution was made by dissolving NaCl (3.3 g, 5.65 mmol/L), Na$_2$SO$_4$ (1.48 g, 1.04 mmol/L) and NaNO$_3$ (1.37 g, 1.61 mmol/L) in 10 litre of pure water. The test feed solution was fed into both the diluate and concentrate compartments of the stack. A electrode solution was made by dissolving K$_3$[Fe(CN)$_6$] (16.5 g) and K$_4$[Fe(CN)$_6$].3H$_2$O (21.1 g) in 1 litre of pure water and this electrode solution was circulated through the electrode compartments.

The test feed solution was fed into the stack through the inlets of the diluate and concentrate compartments at a flow rate of 250 cm$^3$/min (corresponding to a linear flow velocity of 4.6 cm/s) and the solutions exiting the diluate and concentrate compartments were collected separately.

A constant current of 0.11 A was applied continuously across the model stack as the abovementioned test feed solutions were passed through both the diluate and concentrate compartments of the stack. Samples of the solutions exiting the diluate and concentrate compartments were collected separately at 10, 15 and 20 minutes after the start. All the samples of composite ion exchange membranes including reference samples (i.e. untreated feed solution) were analysed by ion chromatography to quantify the concentration of nitrate (NO$_3^-$), sulphate (SO$_4^{2-}$) and chloride (Cl$^-$) ions present. The ion chromatography system was an ICS5000 (Dionex) with AG1 9 guard column and AS19 analytical column (Dionex), and the detection was done by conductivity. A KOH gradient solution prepared with an eluent generator was used for the separation. The nitrate removal rate was calculated based on the comparison with the untreated feed solution by calculating the concentration decrease in the diluate compartment and the concentration increase in the concentrate compartment as follows.

For the Diluate Samples:

[100%−(Analysed NO$_3^-$ concentration in treated diluate)/(NO$_3^-$ concentration in untreated feed solution)].

For the Concentrate Samples:

[(Analysed NO$_3^-$ concentration in treated concentrate)/(NO$_3^-$ concentration in untreated feed solution)−100%].

All 6 values (at 10, 15, 20 minutes for both diluate and concentrate samples) were calculated and averaged].

Sulphate removal rates were calculated by an analogous method to that used for the nitrate removal rate for the measured sulphate concentrations.

The selectivity $P_{SO_4}^{NO3}$ was calculated by performing the calculation [nitrate removal rate]/[sulphate removal rate]. The same method was used to determine the selectivity of the reference membranes.

The following ingredients were used to prepare the composite ion exchange membranes:

| | |
|---|---|
| MBA | is N,N'-methylene bisacrylamide from Sigma Aldrich |
| AMPS | is 2-acryloylamido-2-methylpropanesulfonic acid from Hang-Zhou (China). |
| LiSS | is lithium p-styrenesulfonate from Tosoh, Japan. |
| HEMA | is 2-hydroxyethylmethacrylate from Sigma Aldrich. |
| DMAPAA-Q | is a 75 wt % aqueous solution of 3-acrylamidopropyl-trimethylammonium chloride from Kohjin |
| Darocur ™ 1173 | is 2-hydroxy-2-methyl-1-phenyl-propan-1-one, a photoinitiator from BASF Resins, Paint & Coatings. |
| MeHQ | is hydroquinone monomethyl ether, a polymerisation inhibitor from Merck. |
| IPA | is 2-propanol from Shell (an inert organic solvent). |
| LiNO$_3$ | is lithium nitrate from Sigma Aldrich. |
| LiOH•H$_2$O | is lithium hydroxide monohydrate from Chemetall. |
| Viledon ® Novatexx 2223-10 | is a nonwoven polyolefin porous support from Freudenberg Filtration Technologies. |
| PW | is pure water (an inert solvent). |
| Surfactant | is Capstone ® fluorosurfactant from Chemours. |
| AMX | is a commercially available membrane from Astom Corp., Japan, having a surface zeta potential of −3 mV. |
| ACS | is a commercially available monovalent anion selective membrane from Astom Corp., Japan, having a surface zeta potential of −20 mV. |

Preparation of Membrane Layer (a) (Untreated Membrane, "UM1")

A composition containing the ingredients indicated in Table 1 wherein all amounts are in wt % relative to the total weight of the composition, was applied by hand to an aluminium underground carrier using a 150 μm wire wound bar, at a speed of approximately 5 m/min, followed by application of a Viledon® Novatexx 2223-10 non-woven support. Excess composition was scraped-off using a wire bar (Standard K bar No. 0 with 0.05 mm diameter wire, by RK Print Coat Instruments Ltd) and the impregnated support was cured by irradiation with UV light (D-bulb) with a dose of 0.43 J/cm² at one side and subsequently with 0.43 J/cm² on the other side.

TABLE 1

Preparation of Membrane layer (a)

| ingredient | Wt % |
|---|---|
| DMAPAA-Q | 53.20 |
| MBA | 9.90 |
| PW | 7.00 |
| IPA | 8.40 |
| Darocur ™ 1173 | 0.50 |
| MEHQ | 0.05 |
| LiNO$_3$ | 19.95 |
| Surfactant | 1.00 |

The resultant membrane UM1 was stored in a sealed bag at room temperature.

Preparation of Curable Compositions Used to Prepare the Layer (b)

Curable compositions A, B, C and D were prepared by mixing the ingredients indicated in Table 2 below:

TABLE 2

| | Curable Compositions | | | |
|---|---|---|---|---|
| ingredient | Comp. A | Comp. B | Comp. C | Comp. D |
| AMPS | 40.0 | 20.0 | 6.9 | 0 |
| LiSS | 0 | 0 | 0 | 30 |
| HEMA | 0 | 0 | 4.35 | 0 |
| Water* | 54.6 | 75.7 | 86.22 | 69 |
| LiOH•H$_2$O | 4.5 | 2.2 | 1.4 | 0 |
| Darocur ™ 1173 | 0.5 | 1.4 | 1.1 | 0.9 |
| Surfactant | 0.4 | 0.7 | 0.03 | 0.1 |

*0.01 wt % of inhibitor (4-hydroxy-2,2,6,6-tetramethylpiperidin-1-oxyl) was included in the water.

Preparation of Composite Ion Exchange Membranes

The curable compositions indicated in Table 2 were each independently applied to one side of samples of the unmodified membrane UM1 by kiss coating followed by removal of excess curable composition to provide a wet thickness of 24 μm using a wire bar (Standard K bar No. 3 with 0.31 mm diameter wire, by RK Print Coat Instruments Ltd). The curable compositions were irradiated using UV (H-bulb, 0.4 J/cm²) and then dried at 140° C. for 10 seconds in an oven.

The resultant composite ion exchange membranes were then washed by soaking in 0.5M NaCl at 25° C. for one night to remove unreacted curable composition and washed with pure water before each evaluation.

The resultant composite ion exchange membranes of the invention (Examples 1, 2 and 3 derived from curable compositions Comp. B, Comp. C and Comp. D respectively) and their properties were as shown in Table 3 and 4 below.

CEx1 is derived from Comp. A containing large quantities of AMPS which provides a layer (b) having a surface zeta potential outside of the presently claimed range. This is included as a Comparative Example for reference purposes.

CEx2 lacks the layer (b) and is included as a Comparative Example for reference purposes.

CEx3 is AMX as defined above (a commercially available ion exchange membrane included for reference purposes).

CEx4 is ACS as defined above (a commercially available ion exchange membrane included for reference purposes).

TABLE 3

Composite Ion Exchange Membranes and Comparative Examples

| Example | Curable Composition | Zeta potential (mV) | Ion selectivity $P_{SO_4}^{NO3}$ | ΔUV at 380 nm | ER (ohm · cm) |
|---|---|---|---|---|---|
| 1 | Comp. B | −1.3 | 1.5 | 1.03 | 0.90 |
| 2 | Comp. C | −3 | 2.4 | 1.03 | 0.90 |
| 3 | Comp. D | −3 | 1.6 | 1.02 | 1.96 |
| CEx1 | Comp. A | −28 | 4.0 | 1.02 | 0.90 |
| CEx2 | — | +13 | 1.0 | 2.62 | 0.89 |
| CEx3 | — | −3 | 2.3 | 1.60 | 2.3 |
| CEx4 | — | −20 | 4.1 | 1.03 | 5.1 |

TABLE 4

| | Relative membrane surface composition (%) | | | | | | |
|---|---|---|---|---|---|---|---|
| Example | Carbon (C) | Sulphur (S) | Nitrogen (N) | Oxygen (O) | S/C | S/N | S/O |
| 1 | 72 | 2.1 | 4.7 | 18 | 0.029 | 0.45 | 0.12 |
| 2 | 72 | 1.7 | 4.2 | 21 | 0.024 | 0.40 | 0.08 |
| 3 | 71 | 2.0 | 4.6 | 19 | 0.028 | 0.44 | 0.11 |
| CEx1 | 62 | 3.3 | 6.0 | 23 | 0.053 | 0.55 | 0.14 |
| CEx2 | 64 | <0.6* | 7.9 | 21 | <0.009 | <0.08 | <0.03 |
| CEx3 | 82 | <0.6* | 2.1 | 11 | <0.007 | <0.29 | <0.05 |
| CEx4 | 81 | <0.6* | 2.2 | 12 | <0.007 | <0.27 | <0.05 |

*below detection limit

The invention claimed is:

1. A composite ion exchange membrane comprising components (a) and (b):
 (a) a membrane layer comprising ionic groups, two opposing surfaces and optionally a porous support;
 (b) a layer comprising sulpho groups bound to at least one of the at least two opposing surfaces of the membrane layer (a);
 wherein the layer comprising sulpho groups has a thickness of less than 100 nm and the composite ion exchange membrane has a surface zeta potential of 0 to −7.5 mV.

2. The composite ion exchange membrane according to claim 1 wherein the membrane layer (a) is an anion exchange membrane.

3. The composite ion exchange membrane according to claim 1 wherein the layer (b) is covalently bound to the membrane layer (a).

4. The composite ion exchange membrane according to claim 1 wherein the surface zeta potential of the composite ion exchange membrane is as measured using an electrokinetic analyser, preferably after the composite ion exchange membrane has been stored for 16 hours in a 25 mM solution of potassium chloride solution in distilled water having a pH of 4.

5. The composite ion exchange membrane according to claim 1 wherein the layer (b) has a sulphur/carbon atomic ratio of 0.010 to 0.050 as determined by XPS.

6. The composite ion exchange membrane according to claim 1 wherein the layer (b) has a sulphur/nitrogen atomic ratio of 0.30 to 0.50 as determined by XPS.

7. The composite ion exchange membrane according to claim 1 wherein the layer (b) has a sulphur/oxygen atomic ratio of 0.07 to 0.13 as determined by XPS.

8. The composite ion exchange membrane according to claim 1 which has a nitrate/sulphate selectivity ratio of less than 3.0.

9. The composite ion exchange membrane according to claim 1 which has an electrical resistance of less than 2 ohm·cm$^2$ using a 2M aqueous solution of NaCl at 25° C.

10. The composite ion exchange membrane according to claim 1 wherein the membrane layer (a) comprises a front side and a back side as opposing surfaces and only one of the front side and backside is bound to the layer (b).

11. The composite ion exchange membrane according to claim 1 wherein the membrane layer (a) comprises a front side and a back side as opposing surfaces and both the front side and the backside are bound to the layer (b).

12. The composite ion exchange membrane according to claim 1 wherein the layer (b) is obtained from a curable composition comprising:
 i) from 4 to 35 parts of ethylenically unsaturated monomer(s) having an anionic (negative) group;
 ii) from 0 to 30 parts of neutral monomer(s);
 iii) from 40 to 92 parts of inert solvent(s); and
 iv) from 0 to 10 parts of photoinitiator(s).

13. The composite ion exchange membrane according to claim 1 wherein the layer (b) is a coating layer.

14. A process for preparing a composite ion exchange membrane comprising reacting a membrane layer having reactive groups at its surface with a curable composition to form a layer, wherein the curable composition comprises:
 (i) a monomer comprising at least one polymerizable group and a sulpho group; and
 (ii) optionally a neutral monomer;
 wherein the layer has a thickness of less than 100 nm and the composite ion exchange membrane has a surface zeta potential of 0 to −7.5 mV.

15. The process according to claim 14 wherein the curable composition comprises:
 i) from 4 to 35 parts of ethylenically unsaturated monomer(s) having a sulpho group;
 ii) from 0 to 30 parts of neutral monomer(s);
 iii) from 40 to 92 parts of inert solvent(s); and
 iv) from 0 to 10 parts of photoinitiator(s).

16. The process according to claim 14 wherein the layer (b) is grafted from the surface of the membrane layer (a).

17. A method of treating an aqueous liquid comprising introducing the aqueous liquid to the composite ion exchange membrane according to claim 1.

18. An electrodialysis or reverse electrodialysis unit, an electrodeionization module, a flow through capacitor, a diffusion dialysis apparatus, a membrane distillation module, a redox flow battery, a microbial desalination cell, or a membrane electrode assembly, comprising one or more membranes according to claim 1.

* * * * *